H. HANSEN.
CASTER.
APPLICATION FILED MAR. 22, 1917.
1,247,827.
Patented Nov. 27, 1917.
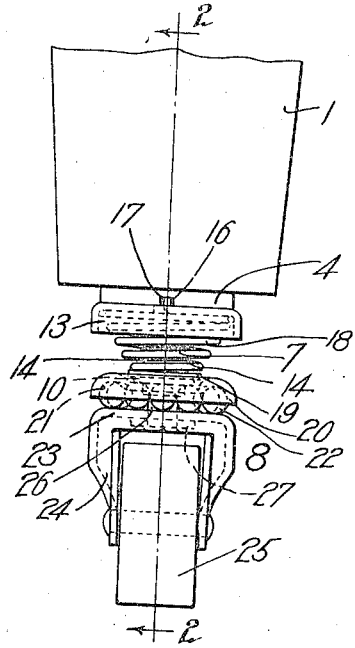
FIG. 1.
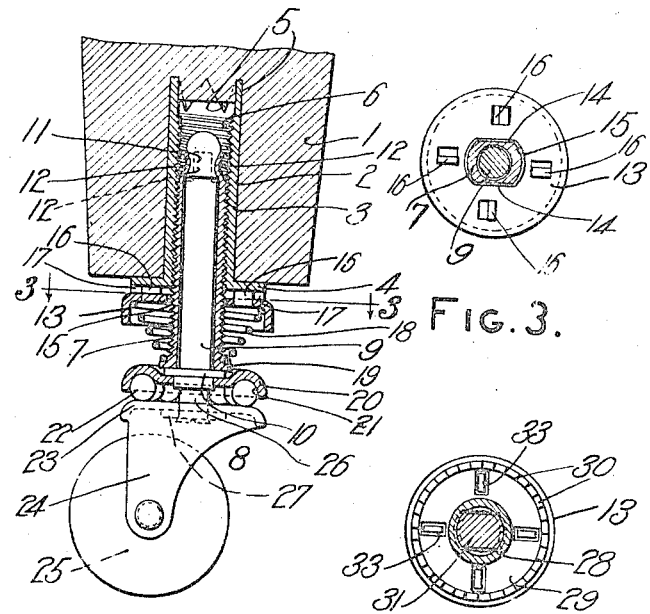
FIG. 2.    FIG. 3.
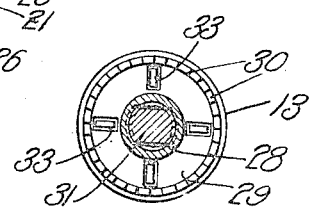
FIG. 5.
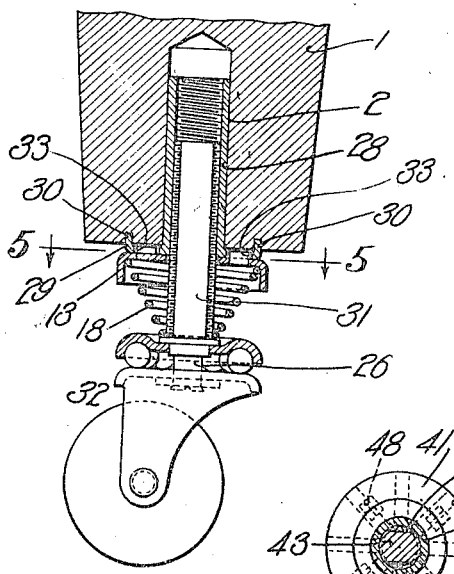
FIG. 4.
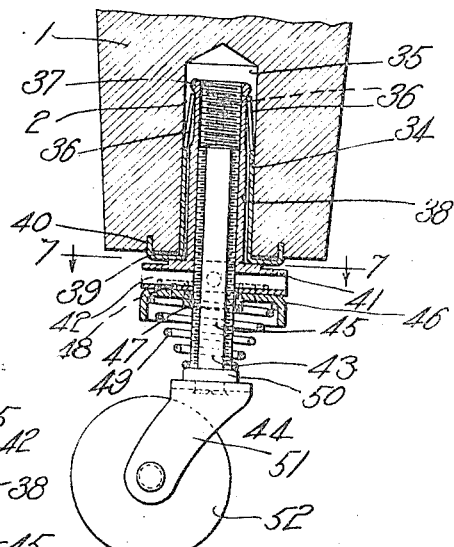
FIG. 6.
FIG. 7.
Inventor:
Harald Hansen
by his attorney,

UNITED STATES PATENT OFFICE.

HARALD HANSEN, OF BOSTON, MASSACHUSETTS.

CASTER.

1,247,827. Specification of Letters Patent. Patented Nov. 27, 1917.

Application filed March 22, 1917. Serial No. 156,716.

*To all whom it may concern:*

Be it known that I, HARALD HANSEN, a subject of the King of Denmark, residing at Boston, in the county of Suffolk and State of Massachusetts, have invented new and useful Improvements in Casters, of which the following is a specification.

This invention relates to improvements in casters and has for its object to provide a strong adjustable caster adapted to be used on either heavy or light pieces of furniture to adjust for uneven places in the surface upon which the caster is resting or to compensate for any unevenness which may exist between the points of the furniture where the several casters are located.

The invention consists in the combination and arrangement of parts set forth in the following specification and particularly pointed out in the claims.

Referring to the drawings:

Figure 1 is a front elevation of a caster embodying my invention attached to a recessed member.

Fig. 2 is a vertical section taken on the line 2—2 of Fig. 1.

Fig. 3 is a transverse section taken on the line 3—3 of Fig. 2.

Fig. 4 is a section, similar to Fig. 2, illustrating a modified form of caster.

Fig. 5 is a detail transverse section taken on the line 5—5 of Fig. 4.

Fig. 6 is a section, similar to Fig. 2, illustrating still another modified form of my invention.

Fig. 7 is a detail section taken on the line 7—7 of Fig. 6.

Like numerals refer to like parts throughout the several views of the drawings.

In the drawings, referring particularly to Figs. 1, 2 and 3, which embody the preferred form of my invention, 1 indicates a portion of a leg of a piece of furniture with a recess 2 formed at the bottom thereof. A socket 3, having a flange 4 at the lower end thereof, is constructed and arranged to fit said recess 2 and is inserted therein. The upper end of the socket 3 is preferably provided with a series of spurs 5 which, when driven into the material constituting the furniture, prevent said socket from rotating therein.

The socket 3 is furthermore internally screw threaded at 6 substantially its entire length and arranged to fit said socket is a screw threaded sleeve 7 which forms a part of the shank of a caster 8. Rotatably mounted within the sleeve 7 is the spindle 9 of said caster which is provided with a collar 10 adjacent its lower end and engaging the lower end of the sleeve 7.

The upper end of said spindle 9 has an annular recess 11 into which fingers 12, at the upper end of said sleeve 7, are adapted to be forced and thus retain said spindle within the sleeve when the furniture on which the caster is mounted is lifted. The fingers 12 are resilient so as to permit the spindle to be withdrawn by force when it is necessary to remove the caster therefrom.

The sleeve 7 projects a substantial distance below the flange 4 and has mounted thereon a locking collar 13. This collar is arranged to move longitudinally of the sleeve 7 but is prevented from being rotated thereon by oppositely disposed flattened surfaces 14, 14 formed lengthwise of said sleeve, said collar having a correspondingly shaped hole 15 formed therein.

The collar 13 furthermore has tongues 16, preferably formed by partially detaching portions of the material forming said collar upwardly and these tongues are arranged to project into recesses 17 formed in the adjacent face of the flange 4. The collar 13 is made cup-shaped with the rim thereof turned downwardly and arranged within said cup-shaped member is a spring 18, preferably spirally formed with the smaller coils thereof arranged against a shoulder 19 at the lower end of the sleeve 7, said spring exerting a yielding upward pressure to the locking collar 13 to maintain the tongues 16 thereof within the recesses 17.

Below the collar 10 of the spindle 9 is mounted a collar 20 having in its under face an annular groove 21 which constitutes a race for a series of balls or rollers 22 adapted to be maintained within said groove 21 by the upper end 23 of a yoke 24 which forms the support for the roller 25 of the caster. The yoke 24 is rotatably mounted upon the lower end 26 of the spindle 9 and is secured in such relation by a washer 27 mounted directly beneath the portion 23 of said yoke and held in place by the expanding of the lower end of said spindle.

To adjust the device just described, the locking collar 13 is depressed against the action of the spring 18 until the tongues 16 are disengaged from the recesses 17, whereupon said collar may be rotated in one direction or the other according to the adjustment desired and with said collar rotates the sleeve 7, moving said sleeve up or down in the socket 3.

The spring 18 causes the collar 13 to move to its normal locking position immediately upon the releasing of pressure thereon, thus maintaining said caster in its adjusted position.

In the form of caster shown in Figs. 4 and 5, the socket 28, similar to the socket 3, has a flange 29 at its lower end having arranged about the outer margin thereof a series of spurs 30 which are adapted to be pressed in the material forming the leg 1 so as to prevent said socket from rotating. These spurs 30 take the place of the spurs 5 of the socket 3.

In this form the sleeve 7 has been omitted and instead the shank 31 of the caster 32 is screw threaded to engage the screw threads upon the interior of said socket, said shank being formed integral with the lower portion 26 of the spindle of the caster and the portion 26 and the related parts are substantially the same in construction as are the corresponding parts of the caster shown in Fig. 2.

The flange 29 is provided with recesses 33 corresponding to the recesses 17 and into these recesses project the tongues 16 of the locking collar 13. Figs. 6 and 7 illustrate another modified form of this invention embodying a bushing 34 arranged within the recess 35 of the leg 1 of a piece of furniture and is similar in construction to that usually employed in such connection.

The inner end of the bushing 34 is slotted in several places as at 36 to permit portions of the material at said end to be bent inwardly and engage an annular rim 37 formed upon a socket member 38 adapted to fit the bushing 34 and rotate therein. The bushing 34 has a flange 39 at its lower end provided with a series of marginal spurs 40 which project into the leg of the furniture and prevent the rotation of said bushing.

The socket member 38 is also provided with a flange 41 which rotates against the flange 39 and is provided with a series of radial sockets 42, permitting the insertion of an instrument for the purpose hereinafter set forth. The socket member 38 is internally screw threaded to receive the screw threaded shank 43 of a caster 44, said shank having oppositely disposed flattened faces 45 extending lengthwise thereof.

A locking collar 46, similar to the collar 13 in Figs. 2 and 4, is mounted upon the shank 45 to move lengthwise thereof but is prevented from rotating thereon by being provided with a hole 47 into which fits the shank 43. The collar 46 has tongues 48 mounted thereon which project into corresponding recesses formed in the flange 41 and a spring 49, engaging the collar 50 on the lower end of the shank 43, and said collar 46 retain said tongues normally in engagement with said recesses. To the lower end of the shank 43 is rigidly secured a yoke 51 which rotatably supports a roller 52. To adjust the caster shown in this form, an instrument is placed within one of the recesses 42 to prevent the rotation of the socket member 38. The collar 46 is then depressed against the action of the spring 49 to withdraw the tongues 48 from the recesses of the member 41, permitting said collar 46, together with the shank 43 of the caster, to be rotated.

This rotation causes said shank to be moved longitudinally of the socket member 38 by the screw threads of said members and when the correct adjustment has been secured pressure is relieved from the collar 46, permitting the tongues to occupy the nearest recesses in the flange 41, whereupon the adjustment may be maintained for an indefinite period. After being adjusted, as described, the socket member 38 is freed by withdrawing the instrument from the recess 42, thus permitting the entire caster to rotate within the bushing 34 during the movement of the piece of furniture from place to place.

Having thus specifically described my invention what I claim and desire by Letters Patent to secure is:

1. A device of the character described having, in combination, a socket, a caster rotatably mounted relatively to said socket, provided with a shank projecting into said socket and rotatable relatively thereto, means for adjusting said shank longitudinally of said socket, a collar on said shank, means on said collar adapted to prevent the movement of said shank relatively to said socket, and means for yieldingly maintaining said collar in its locking position.

2. A device of the character described having, in combination, a socket, means for preventing the rotation of said socket, a caster rotatably mounted relatively to said socket, provided with a shank projecting into said socket and rotatable relatively thereto, means for adjusting said shank longitudinally of said socket, a collar on said shank, means on said collar adapted to prevent the movement of said shank relatively to said socket, and means for yieldingly maintaining said collar in its locking position.

3. A device of the character described having, in combination, a socket, a caster provided with a shank having screw threaded engagement with said socket, a collar movable lengthwise of said shank, adapted to rotate therewith, means for preventing the rotation of said collar relatively to said socket, and a spring to yieldingly maintain said collar in its locked position.

4. A device of the character described having, in combination, a socket, a caster provided with a shank having screw threaded engagement with said socket, a collar movable lengthwise of said shank, adapted to rotate therewith, means on said collar adapted to engage said socket and lock said collar against rotation, and a spring to yieldingly maintain said collar in contact with said locking means.

5. A device of the character described having, in combination, a fixed socket, a shank having screw threaded engagement with said socket, a collar mounted on said shank to rotate therewith, said collar being adapted to move longitudinally of said shank, means on said collar adapted to interlock with said socket to prevent the rotation of said shank relatively to said socket, a spring adapted to yieldingly maintain said collar in its locking position, and a roller pivotally mounted with respect to said shank.

6. A device of the character described having, in combination, a fixed socket, a shank having screw threaded engagement with said socket, a collar mounted on said shank to rotate therewith, said collar being adapted to move longitudinally of said shank, means on said collar adapted to interlock with said socket to prevent the rotation of said shank relatively to said socket, a spring adapted to yieldingly maintain said collar in its locking position, a caster provided with a spindle rotatably mounted within said shank, and means adapted to prevent the withdrawal of said spindle from said shank.

7. A device of the character described having, in combination, a fixed socket, a flange at the lower end of said socket provided with a series of recesses formed on its under face, a sleeve having screw threaded engagement with said socket, said sleeve having a flange at its lower end, a collar mounted upon said sleeve to rotate therewith and having movement longitudinally of said sleeve, a series of tongues formed upon said collar adapted to interlock with the recesses in said socket, a spring interposed between said collar and the flange on said sleeve, adapted to normally maintain the tongues of said collar within the recesses of said socket, and a caster rotatably mounted in said sleeve.

8. A device of the character described having, in combination, a fixed socket, a flange at the lower end of said socket provided with a series of recesses formed on its under face, a sleeve having screw threaded engagement with said socket, said sleeve having a flange at its lower end, a collar mounted upon said sleeve to rotate therewith and having movement longitudinally of said sleeve, a series of tongues formed upon said collar adapted to interlock with the recesses in said socket, a spring interposed between said collar and the flange on said sleeve, adapted to normally maintain the tongues of said collar within the recesses of said socket, a caster provided with a spindle arranged in rotatable relation with said sleeve, means for temporarily preventing the withdrawal of said spindle on said sleeve, and a roller rotatably mounted upon said spindle.

In testimony whereof I have hereunto set my hand in presence of two subscribing witnesses.

HARALD HANSEN.

Witnesses:
SYDNEY E. TAFT,
HATTIE E. STRATTON.